United States Patent
Harris et al.

(10) Patent No.: US 8,311,593 B2
(45) Date of Patent: Nov. 13, 2012

(54) METHOD AND APPARATUS FOR ADJUSTING AN ON DURATION IN A DISCONTINUOUS RECEIVE TRANSMISSION MODE

(75) Inventors: John M. Harris, Glenview, IL (US); Ivan N. Vukovic, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 593 days.

(21) Appl. No.: 12/510,398

(22) Filed: Jul. 28, 2009

(65) Prior Publication Data

US 2010/0034142 A1 Feb. 11, 2010

Related U.S. Application Data

(60) Provisional application No. 61/087,829, filed on Aug. 11, 2008.

(51) Int. Cl.
*H04M 1/00* (2006.01)
*H04B 1/16* (2006.01)

(52) U.S. Cl. .......... 455/574; 455/343.2; 455/343.5; 455/230; 455/434

(58) Field of Classification Search .......... 455/574, 455/127.5, 343.1, 343.2, 343.4, 343.5; 370/311
See application file for complete search history.

(56) References Cited

U.S. PATENT DOCUMENTS

| | | | |
|---|---|---|---|
| 5,678,227 A | 10/1997 | Connell et al. | |
| 8,023,442 B2 * | 9/2011 | Kim et al. | 370/311 |
| 8,121,045 B2 * | 2/2012 | Cai et al. | 370/252 |
| 2007/0286080 A1 * | 12/2007 | Kim et al. | 370/236 |
| 2007/0291673 A1 * | 12/2007 | Demirhan et al. | 370/311 |
| 2009/0303927 A1 * | 12/2009 | Kolding et al. | 370/328 |
| 2010/0014429 A1 * | 1/2010 | Kim et al. | 370/241 |
| 2010/0034145 A1 * | 2/2010 | Kim et al. | 370/328 |
| 2010/0113023 A1 * | 5/2010 | Huang et al. | 455/436 |
| 2010/0197316 A1 * | 8/2010 | Aoyama et al. | 455/452.1 |

OTHER PUBLICATIONS

Ayala, Perriello M.: "The International Search Report and the Written Opinion of the International Search Authority", European Patent Office, Rijswijk, completed: Jan. 26, 2010, mailed: Feb. 2, 2010, all pages.

* cited by examiner

Primary Examiner — Duc M Nguyen

(57) ABSTRACT

A method and an apparatus that includes establishing a link (106) between a first node (102) and a second node (104) in a wireless communication network (100). The method continues by setting a discontinuous receive (DRX) transmission mode cycle for the link wherein the DRX cycle includes an on duration (202) followed by an off cycle (204). The duration of the on duration on a downlink is adjusted (610) based on a function of the availability of a channel quality indicator (CQI) channel used on the link.

19 Claims, 4 Drawing Sheets

METHOD AND APPARATUS FOR ADJUSTING AN ON DURATION IN A DISCONTINUOUS RECEIVE TRANSMISSION MODE

FIELD OF THE INVENTION

The present invention relates generally to the use of discontinuous receive transmission mode in a wireless communication network and, in particular to adjusting the duration of an on duration in the discontinuous receive transmission mode cycle as a function of a channel quality indicator.

BACKGROUND

Wireless communication networks including Long Term Evolution (LTE) use links between the multiple nodes, such as user equipment and Node Bs, within the system. These links include an uplink portion from user equipment to the Node B or eNode B in the network and a downlink portion from the Node B or eNode B in the network to the user equipment. During a connected mode for the user equipment, the links can utilize a discontinuous receive (DRX) transmission mode. DRX is used in networks such as LTE to allow user equipment to move into a sleep mode while maintaining a connection with the Node B. While in the sleep mode, the user equipment can power down some of operational functions thereby conserving battery power.

A DRX cycle defines the period of an individual time interval between monitoring paging information for a specific user equipment. In other words, the DRX cycle defines the periodic repetition of the on duration followed by a possible period of inactivity. The discontinuous transmission cycle includes an on duration of a given number frames followed by an opportunity for DRX, otherwise known as an off cycle. The user equipment determines it's on duration and off cycle based on stored specific discontinuous transmission cycle length data. The longer the DRX cycle, the longer the user equipment is in a sleep state and before it can check and respond to a paging message. The DRX cycle length is given in number of frames, where 1 frame is usually known to be 1 msec and the on duration is usually set for 3 or 7 frames.

The duration of the on duration and the off cycle is known to be variable. The durations may be set according to a profile set up on the user equipment. Generally, once the durations have been set, the periods are fixed. An off cycle that is too long may result in unnecessary or unacceptable levels of delay in receiving a paging signal. On the other hand, an off cycle that is too short may reduce the operating life of the user equipment's battery.

The on duration timer specifies the number of consecutive downlink frames during which the user equipment shall monitor the physical downlink control channel (PDCCH) for possible allocations. The longer the on duration time is the user equipment has more flexibility, reliability and reduces delay. On the other hand, a longer on duration timer has adverse affects on battery life. Thus, there is a need to consider issues related to the battery life for the user equipment in light of the DRX cycle.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
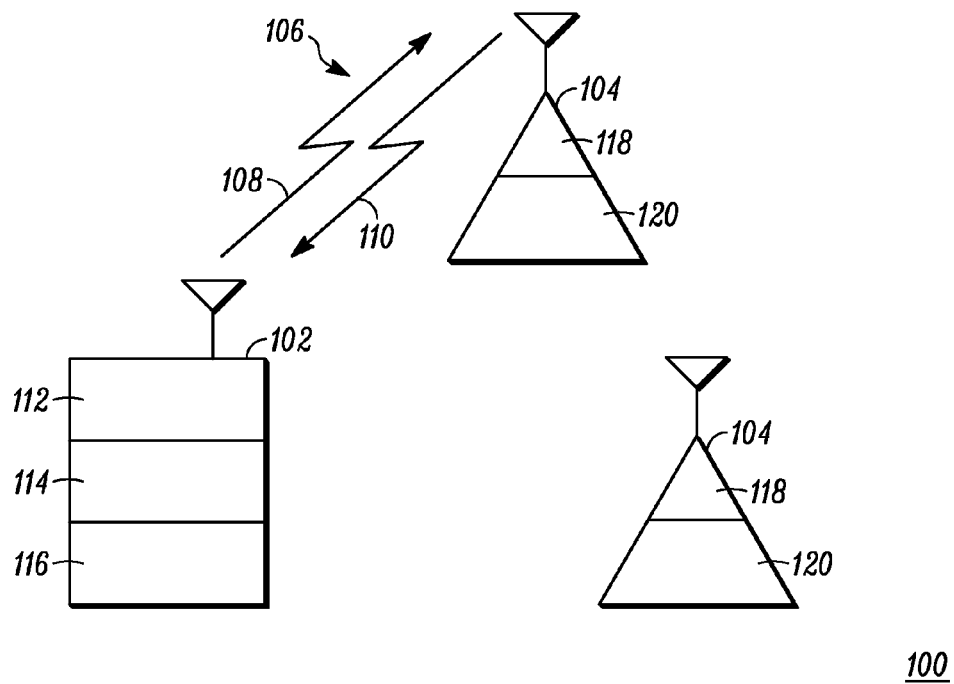
FIG. 1 is a block diagram of components in a wireless communication network that is in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and apparatus for adjusting an on duration timer in a discontinuous receive transmission mode. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method and apparatus to adjust the on duration timer in a discontinuous receive transmission mode described herein. The non-processor circuits may include, but are not limited to, a radio receiver, a radio transmitter, signal drivers, clock circuits, power source circuits, and user input devices. As such, these functions may be interpreted as steps of a method to perform adjusting the on duration timer in the discontinuous receive transmission mode. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method that includes establishing a link between a first node and a second node in a wireless communication network such as LTE and similar systems. The method continues by setting a discontinuous receive (DRX) transmission mode cycle for the link wherein the DRX cycle includes an on duration followed by an off cycle. The duration of the on duration on a downlink is adjusted based on a function of the availability of a channel quality indicator (CQI) channel used on the link. In an embodiment, the on duration is reduced down to at least 1 frame from a set value when the CQI channel is not available. In another embodiment, the on duration is increased when the CQI channel becomes available.

In another embodiment of the invention, a user equipment apparatus is provided that includes a transceiver coupled to a processor. The transceiver transmits and receives frames over a link in a wireless communication system. The processor is configured to establish the link, which includes an uplink and a downlink, sets a DRX cycle for transmitting data over the link, wherein the discontinuous transmission cycle includes an on duration and an off cycle, and adjusts the duration of the on duration based on the availability of a channel quality indicator (CQI) channel on the link. The processor reduces the on duration when the CQI channel is not available and the on duration can be reduced down to just 1 frame. The processor increases the on duration when the CQI channel is available.

The present invention also includes a method that includes establishing a link between a user equipment and a node in a wireless communication system and setting a DRX cycle for the link wherein the DRX cycle includes an on duration followed by an off cycle. The duration of the on duration can be adjusted as a function of the load on the link, signal strength experienced by the user equipment, the user equipment receiving streaming services with small packet arrival jitter or the user equipment having a fixed power supply.

Turning to FIG. 1, a wireless communication network 100 is shown where the wireless communication network can be any known and developed network including network based on third generation and Long Term Evolution (LTE) standards and specifications. The network 100 includes multiple nodes that operate within the network including user equipment 102 and base station 104, which in the context of LTE can be Node Bs and eNode Bs. As is known, network 100 includes a plurality of base stations to cover the given area of the network and multiple user equipment 102 can communicate with any of the base stations 104. The user equipment 102 represents any type of mobile wireless device including a mobile phone or wireless device that has phone capability. Base station 104 represents an access point to the wireless communication network 100 to which the user equipment 102 belongs. The user equipment 102 and base station 104 communicate with one another over a link 106. The link 106 includes an uplink portion 108 that communicates data from the user equipment 102 to the base station 104 and a downlink portion 110 that communicates data from the base station 104 to the user equipment 104.

The user equipment 102 includes a transceiver 112, processor 114 and battery 116, which provides power to the user equipment and its components. The transceiver transmits data to the base station on the uplink 108 and receives data from the base station on the downlink 110. The transceiver 112 transmits and receives the data on the uplink and downlink according to known processes and protocols including LTE that are controlled by the processor 114. In addition, the processor 114 can control the DRX cycle for the user equipment 102. The base station 104 includes a transceiver 118 and a processor 120. The transceiver transmits data to the user equipment on the downlink 110 and receives data from the user equipment on the uplink 108.

Figure 2:
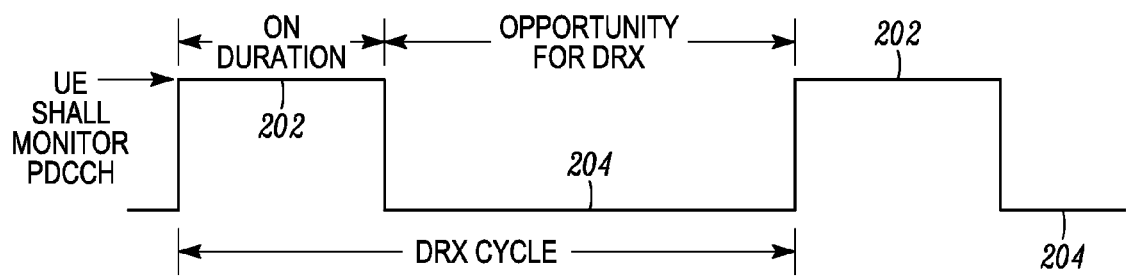
FIG. 2 is a diagram illustrating the discontinuous receive transmission mode cycle adjusted in accordance with some embodiments of the invention.

Turning to FIG. 2, the user equipment can operate in a number of modes including connected mode. In connected mode, link 106 is provided between the user equipment 102 and the base station 104. To increase the battery life for the user equipment, discontinuous receive (DRX) transmission mode provides a method by which the user equipment listens for a paging and other signals during given periods of time. The paging signal is transmitted from the base station 104 to the user equipment 102 on the physical downlink control channel (PDCCH) 200. As stated, DRX specifies the periodic repetition of an on duration 202 in which the user equipment listens for the paging cycle. The on duration 202 is followed by an off cycle 204 in which the paging signal may have been sent, but the user equipment will not be listening for. The on duration can be of a variety of different durations and can be controlled by an on timer, which may be adjusted by processor 114 as described.

During operations of the user equipment 102 and base station 104, numerous parameters are transmitted and received between the nodes. One such parameter is the channel quality indicator (CQI) that is a measurement of the communication channels between the user equipment and the base station, which include the uplink 108 and downlink 110. A high CQI value indicates a channel with high quality. A CQI can be computed by using a performance metric, such as signal-to-noise ratio, signal-to-interference plus noise ratio etc. These values and other can be measured for a given channel and then used to compute the CQI of the channel. The CQI can be communicated by the user equipment 102 and the base station on a CQI channel which is a part of the link 106. As is understood, CQI information can be periodically transmitted on the CQI channel at given intervals for a given duration. At the expiration of that duration CQI information is no longer transmitted. A cycle of CQI transmissions being transmitted can be established. The lack of CQI information and transmissions can occur when the user equipment is not synchronized with the base station, which may occur when the user equipment has traveled too far from a base station and the uplink transmission will not be received by the base station at the beginning of a subframe.

Figure 3:
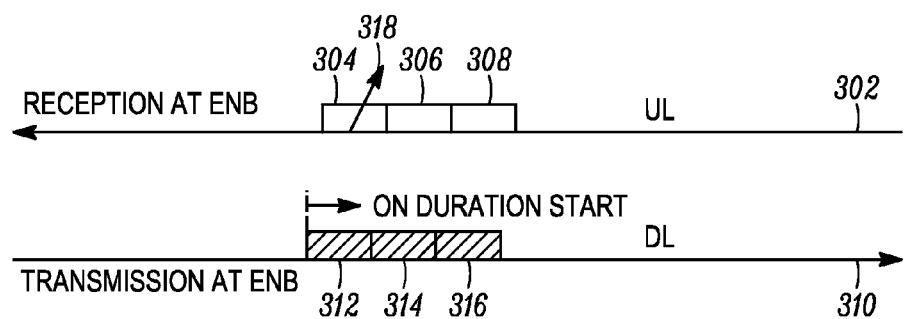
FIG. 3 is a diagram illustrating the sending channel quality indicators with respect to the discontinuous receive transmission mode as used by some embodiments of the invention.

In the case where the user equipment 102 reports periodic CQI during the on duration 202, the base station 104 can configure a periodic CQI report transmission for the uplink 108. During part of the on duration 202, data transmission can occur without accurate channel information, therefore limiting transmission effectiveness. FIG. 3 demonstrates where part of the on duration may not have CQI information. The uplink 302 provides data to the base station from the user equipment. Frames 304, 306 and 308 indicate frames during the on duration of the uplink 302. Downlink 310 provides data to the user equipment from the base station. Frames 312, 314 and 316 indicate frames during the on duration of the downlink 310. Arrow 318 indicates the when the CQI information is transmitted on the uplink. If the uplink CQI transmission on a CQI channel is aligned with the start time of the on duration 202, there can be at least two frames 312, 314 at the beginning of the on duration that will not have accurate and complete channel information from the periodic CQI report. For this reason, when there is recent data activity it will be desirable to configure the on duration which has addition frames from frames 312-316.

Figure 4:
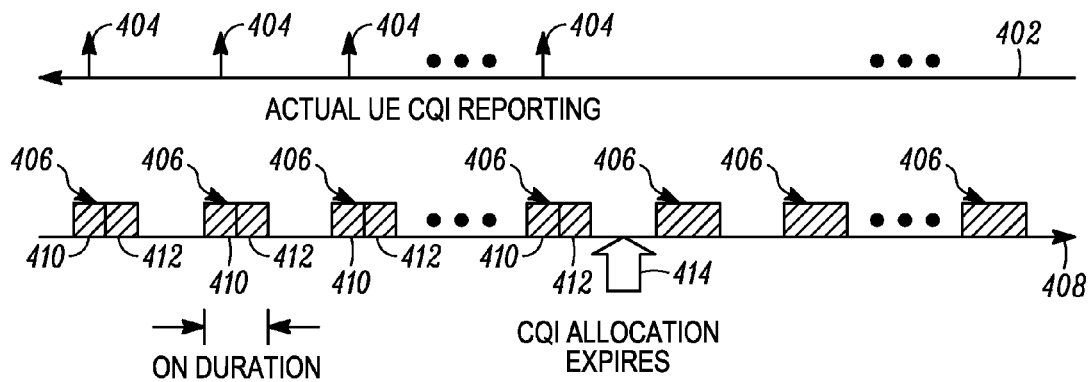
FIG. 4 is a diagram illustrating the effect of having the expiration of channel quality indicators with respect to discontinuous receive transmission mode.

FIG. 4 shows functionality where the on duration is sufficient long that a portion of the on duration has periodic CQI information. As with FIG. 3, CQI information is periodically transmitted on the uplink 402 as is designated by arrows 404. Periodic on durations 406 are a part of the downlink 408 and include a plurality of frames 410, 412. During frame 412, the on duration of the downlink can benefit from the CQI information that was transmitted during frame 410. By doing this, the user equipment 102 and the base station 104 will have the most recent CQI information available for use during the same on duration during which it is reported. At 414, the allocation of CQI information on the uplink expires. At this point, no frames of the on duration can benefit from the CQI information because it is not being transmitted.

Figure 5:
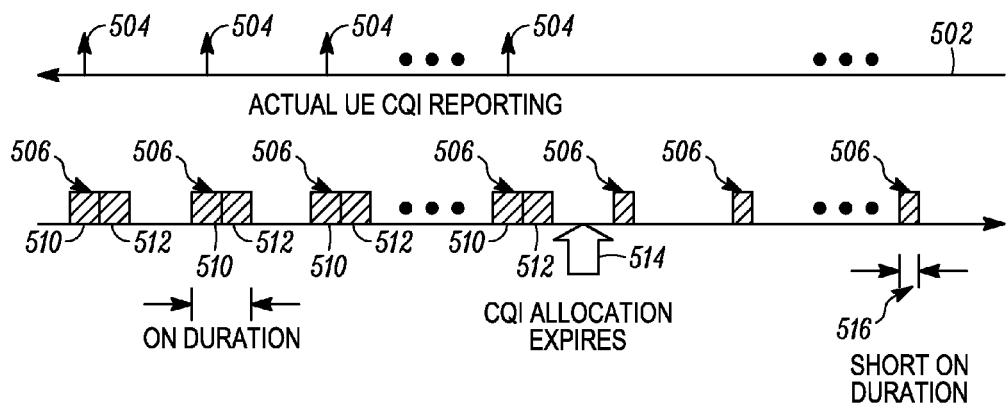
FIG. 5 is a diagram illustrating the adjusting the duration of an on duration portion of the discontinuous receive transmission mode as a function of the channel quality indicator in accordance with some embodiments of the invention.

After point 412, the user equipment may not have had data activity for a prolonged period of time. This can be because the CQI allocation has expired or because the user equipment has entered a long DRX transmission mode. At this point a shorter on duration may be appropriate. FIG. 5 illustrates an adjustment of the on duration based on and as a function of availability of CQI information. CQI information is periodically transmitted on the uplink 502 as designated by arrows 504. Periodic on durations 506 in the downlink 508 include a plurality of frames 510, 512 where at least one of the frames 512 can benefit from the CQI information. At point 514, CQI information no longer is being provided and the on durations therefore cannot utilize CQI information. As such, the duration of the on duration is reduced. As shown, the duration of on duration can be reduced to one frame 516. When the CQI information is transmitted on the uplink after a period of not being available, the duration of the on duration can be increased from its current level. As can be understood, by using an on duration of 1 frame instead of 3 or 7 frames, standby battery life of the user equipment can be increased.

Figure 6:
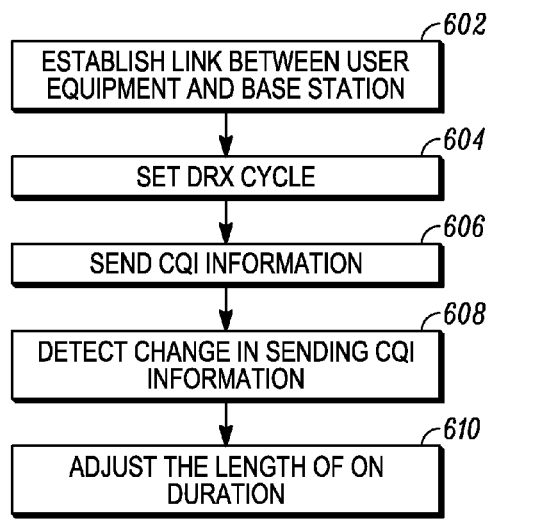
FIG. 6 is a flow chart describing adjusting the duration of an on duration portion of a discontinuous receive transmission mode in accordance with some embodiments of the invention.

FIG. 6 is a flow chart that illustrates the process 600 of adjusting the duration of the on duration during a DRX cycle in a wireless communication network 100. A link 106 is established 602 between user equipment 102 and base station 104. While the link is established, the user equipment is in a connected mode as an active connection exists between the user equipment and the base station. While in the connected mode, the user equipment can be in an active mode and a sleep mode. The link includes an uplink portion 108 and a downlink portion 110.

A DRX cycle is set 604 for the link so that during the uplink and downlink there is an on duration that is followed by an off cycle. As described, the user equipment can receive a paging message from the base station during the on duration. During the off cycles, the user equipment's processor shuts down certain processes to conserve battery functions.

On the uplink, CQI information is periodically sent 606 at given intervals. The CQI information can be sent on a CQI channel of the link. As described the CQI information is periodically can be sent for a set amount of time and at the expiration the CQI information ceases. When there is no CQI information or channel, the downlink and on duration can not benefit from the data. The method continues in detecting 608 a change in the transmission of CQI information. When the change is detected, the duration of the on duration is adjusted 610.

When the CQI information ceases or the CQI channel is not available, the duration of the on duration is reduced. In an embodiment, the on duration is reduced to 1 frame or 1 msec. during which the user equipment is awake to detect a paging message. When the CQI information is once again available and the CQI channel is established, the on duration can be increased from 1 frame to 3 frames or 7 frames. In addition, the duration of the on duration can be increased after the link is established and the DRX cycle is established with a default number of frames, e.g. 3 frames. If the CQI information is then detected, the number can be increased. The number of frames to increase the duration can depend on the timing of the period CQI information on the CQI channel. In addition, the duration of the on duration can be adjusted as a function of the length of time since the last data was sent on the link. As the length of time increases, the duration of the on duration can be reduced.

Figure 7:
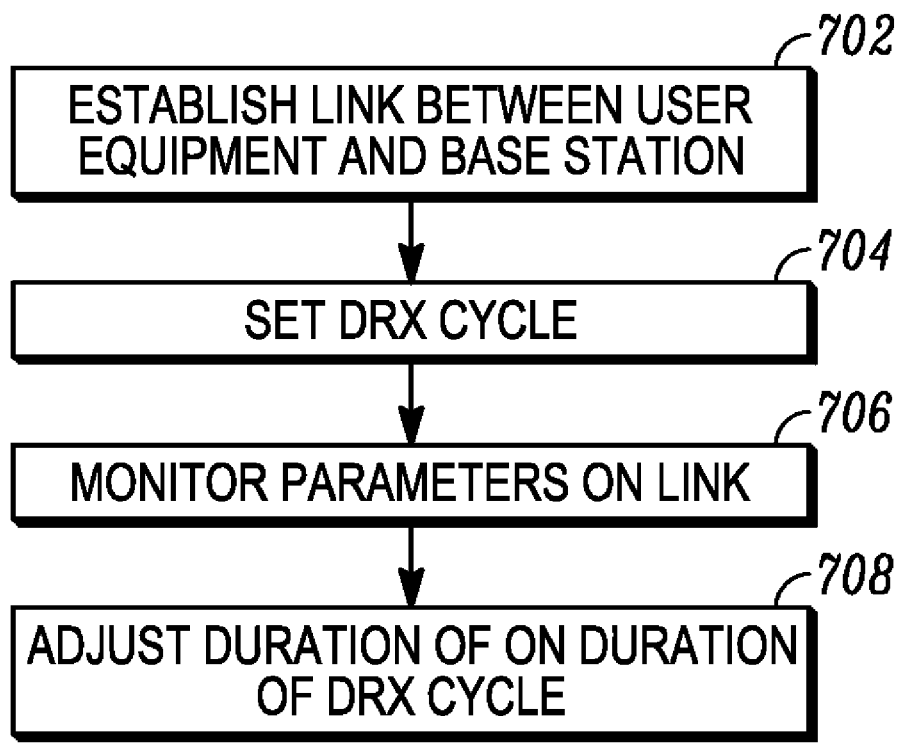
FIG. 7 is a flow chart describing adjusting the duration of an on duration portion of a discontinuous receive transmission mode in accordance with another embodiment of the invention.

FIG. 7 is a flow chart of another embodiment of the present invention in which the duration of the on duration in a DRX cycle is modified. A link 106 is established 702 between user equipment 102 and base station 104. A DRX cycle is set 704 for the link so that during the uplink and downlink there is an on duration that is followed by an off cycle. In an effort to conserve battery power, the user equipment 102 and base station 104 monitors 706 a number of parameters including the load on the uplink and downlink, signal strength experienced by the mobile station, whether the user equipment is receiving streaming services, jitter and the type of power supply. Based on the results of the monitoring of parameters, the duration of the on duration can be adjusted 708.

For example, as the load on the link increases the duration of the on duration can be increased so that the load can benefit from parameters such as CQI. If there is a high signal strength, the user equipment 102 may be close to a base station 104. Thus, the on duration can be decreased. Similarly, when the user equipment is receiving streaming serves with small packet arrival jitter, the on duration can be reduced. Moreover, if the user equipment has fixed power supply then the on duration can be reduced.

By using this mechanism, the battery life of user equipment can be improved and increased by adjusting the duration of an on duration in a DRX cycle. In particular, the battery life can be improved from between 10% to 30% when the on duration is set for a long on time, e.g., seven frames, when the CQI channel is allocated and CQI information is being sent, and to adjust the on duration to one frame when no CQI channel is allocated. In an embodiment, it is possible to have the on duration be adjusted from the long period to the short period automatically and without requiring any explicit signaling when the CQI information and channel are no longer available.

To obtain these improvements, the following calculations can be performed. The baseband current is defined as the amount a current that is drawn from the battery by the user equipment when it is in an inactive state or a sleep mode.

$B$=Baseband current=avg. current when not awake= (deep) Sleep current

The multiplicative increase in the current being trained for the user equipment when it is an active state is given as a multiplier, e.g. 115, of the baseband. Accordingly, $M(L)$=listening current multiplier=Awake listening current/baseband current=$C(L)/B$ Where C(L) is an awake listening current or the average current drain of the user equipment while in the active state.

The DRX interval is the time between initiating subsequent on intervals, i.e. the periodic on duration 202 followed by the off cycle 204. In an example, the DRX interval, DI, can have a value of 700 ms. The total number of frames N the user equipment is awake per on duration can be 1, 3 or 7 frames. Additionally, each frame is composed of 14 symbols. Typically the user equipment consumes consumed current for between three and five symbols per frame. For example, if the UE is monitoring 2 symbols of the control channel, it may need to also be consuming current for an additional two symbols while it is warming up, warming down, and while decoding the last frame received. Accordingly, $T(L)$=Time when $MS$ is awake per frame checked, per frame=$N*4/14$ In addition, user equipment monitors at most 3 symbols and an additional 2 symbols for decoding time. Where there are 14 symbols per 1 ms frame, user equipment can be awake time of up to 5 symbols. The mobile also continues receiving the subframe while it is decoding the PDCCH.

In view of the foregoing, the average listening current is proportional to the current multiplier, times the time awake per on time, divided by the length of the DRX interval.

$$\text{Avg. listening current} = (\text{active Current}) * T(L)/DI =$$
$$= B*[M(L)*T(L)/DI]$$
$$= B*(130*(N*4/14)/700)$$

Thus, when the uplink is under loaded and N=1, the average listening current is 0.053B. When the uplink is overloaded and N=3, the average listening current is 0.159, and when N=7 the average listening current is 0.371.

Lastly, standby battery can be calculated as being proportional to one divided by the average current drain plus the baseband current. In this case, the battery life is proportional to:

0.95, if N=1
0.86, if N=3
0.73, if N=7

Moreover, the talk time battery life can be shown with $S$=Battery Size/(Avg. listening current+$B$)

As a result, the overall battery life improvement of reducing the number of frames of longtime from three frames to one frame is 1.1 because:

$1.1=(0.95*k/0.86*k)$

If reducing it from seven frames to one frame, then the battery life improvement is 1.3 as:

$1.3=(0.95*k/0.73*k)$

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   establishing a link between a first node and a second node in a wireless communication network;
   setting a discontinuous receive transmission mode cycle for the link wherein the discontinuous receive transmission mode cycle includes an on duration followed by an off cycle, and
   adjusting the duration of the on duration based on the availability of a channel quality indicator, wherein adjusting the duration of the on duration comprises reducing the duration of the on duration when the channel quality indicator is not available.

2. The method of claim 1 wherein the reduced duration of the on duration is 1 frame.

3. The method of claim 1 wherein adjusting the duration of the on duration comprising increasing the duration of the on duration when the channel quality indicator is available.

4. The method of claim 1 wherein the wireless communication system is a Long Term Evolution system.

5. The method of claim 1 wherein the link includes an uplink and an downlink and the adjusting the duration of the on duration comprises adjusting the duration of the on duration for the downlink.

6. The method of claim 1 wherein adjusting the duration of the on duration improves battery life of one of the first node and the second node.

7. The method of claim 1 wherein the link is in a connected mode of the wireless communication system.

8. An apparatus comprising:
   a transceiver for transmitting and receiving frames over a link in a wireless communication system, and
   a processor coupled to the transceiver wherein the processor being configured to establish the link, setting a discontinuous receive transmission mode cycle for transmitting data over the link, wherein the discontinuous receive transmission mode cycle includes an on duration and an off cycle, and adjusting the duration of the on duration based on the availability of a channel quality indicator on the link, wherein the processor reduces the on duration when the channel quality indicator is not available.

9. The apparatus of claim 8 wherein the processor reduces the on duration to 1 frame.

10. The apparatus of claim 8 wherein the processor increases the on duration when the channel quality indicator is available.

11. The apparatus of claim 8 wherein the link includes an uplink and a downlink and the discontinuous receive transmission mode cycle being on the downlink from the apparatus to a node in the wireless communication system.

12. The apparatus of claim 8 wherein in the link is a part of a connected mode of the wireless communication system.

13. The apparatus of claim 8 wherein the processor reduces the on duration as a function of duration of time for which the data is previously sent on the link.

14. A method comprising:
    establishing a link between a user equipment and a node in a wireless communication system;
    setting a discontinuous receive transmission mode cycle for the link wherein the discontinuous receive transmission mode cycle includes an on duration followed by an off cycle, and
    adjusting the duration of the on duration as a function of one of the load on the link, the user equipment receiving streaming services with small packet arrival jitter and the user equipment having a fixed power supply.

15. The method of claim 14 wherein the adjusting the duration of the on duration comprising reducing the duration of the on duration.

16. The method of claim 14 wherein the duration of the on duration being reduced to 1 frame.

17. The method of claim 14 wherein the link includes a downlink and an uplink between the user equipment and the node and the on duration being adjusted for the downlink.

18. A method comprising:
    establishing a link between a first node and a second node in a wireless communication network;
    setting a discontinuous receive transmission mode cycle for the link wherein the discontinuous receive transmission mode cycle includes an on duration followed by an off cycle, and
    adjusting the duration of the on duration based on the availability of a channel quality indicator wherein adjusting the duration of the on duration comprising increasing the duration of the on duration when the channel quality indicator is available.

19. An apparatus comprising:
    a transceiver for transmitting and receiving frames over a link in a wireless communication system, and
    a processor coupled to the transceiver wherein the processor being configured to establish the link, setting a discontinuous receive transmission mode cycle for transmitting data over the link, wherein the discontinuous receive transmission mode cycle includes an on duration and an off cycle, and adjusting the duration of the on duration based on the availability of a channel quality indicator on the link wherein the processor increases the on duration when the channel quality indicator is available.

* * * * *